United States Patent [19]

Wicke et al.

[11] Patent Number: 4,513,887
[45] Date of Patent: Apr. 30, 1985

[54] INSTANT HOT WATER DISPENSER

[75] Inventors: Charles A. Wicke; Wayne C. Riley, both of Racine, Wis.

[73] Assignee: Emerson Electric Co., St. Louis, Mo.

[21] Appl. No.: 552,465

[22] Filed: Nov. 16, 1983

Related U.S. Application Data

[62] Division of Ser. No. 421,633, Sep. 22, 1982, Pat. No. 4,424,767.

[51] Int. Cl.$^3$ ............................................. B67D 5/62
[52] U.S. Cl. .................................................. 222/146.5
[58] Field of Search .................... 222/146 HE, 146 H; 219/441; 99/316

[56] References Cited

U.S. PATENT DOCUMENTS

| | | | |
|---|---|---|---|
| 3,642,176 | 2/1972 | Dreibelbis et al. | 222/146 HE |
| 3,891,124 | 6/1975 | Dreibelbis | 222/146 HE |
| 3,905,518 | 9/1975 | Dreibelbis et al. | 222/146 HE |
| 3,927,802 | 12/1975 | Lavochkin et al. | 222/146 HE |

Primary Examiner—Stanley H. Tollberg
Attorney, Agent, or Firm—Fuller, House & Hohenfeldt

[57] ABSTRACT

An instant hot water dispenser has an upper plastic tank section connected to a lower brass tank section by a safety clamping arrangement which includes outturned tabs on the upper plastic tank section which interfit in notches in the brass lower tank section and a retainer ring located between the plastic tabs and outturned metal flanges on the brass tank section. An O-ring seal between the plastic upper tank and the brass tank provides a fluid seal. Various of the plumbing connections are integrally molded with the plastic top and expansion chamber cover which is separated from the main water tank by a common wall or partition. An aspirator opening in an integrally formed plastic stem in the expansion chamber cover aspirates water from the expansion chamber as incoming cold water passes the aspirator opening.

1 Claim, 7 Drawing Figures

INSTANT HOT WATER DISPENSER

This is a division of application Ser. No. 421,633, filed Sept. 22, 1982, now U.S. Pat. No. 4,424,767.

BACKGROUND OF THE INVENTION

The present invention relates to hot water dispensers with an integral heating element in which water is maintained at a useful temperature in a location proximate the dispensing outlet. The dispenser is provided with a main chamber and an expansion chamber. As the cold water is heated, some water expands into an expansion chamber through the inlet pipe and inlet pipe aspirator hole. When the dispenser is dispensing, cold water passing through an inlet pipe and venturi aspirates hot water from the expansion chamber and through the aspirator hole and mixes it with the incoming cold water. The incoming cold water displaces the hot water in the main chamber through an outlet pipe connected to the dispenser or faucet outlet. The expansion chamber prevents expanded water from dripping out the faucet spout during the heating cycle. U.S. Pat. No. 3,891,124 is illustrative of an aspirator in the cold water inlet side of the system.

The water tank of the present invention includes an upper tank section molded from plastic and a lower metallic or brass section. It is known to have water tanks with upper plastic sections and lower metallic sections. U.S. Pat. No. 3,730,144 discloses a hot liquid dispenser which has a transparent plastic upper tank section to enable inspection of the interior. In the present invention, the plastic upper tank section has integrally molded therein various of the plumbing connection components. In addition, the plastic tank section comprises the major portion of the tank and the insulating capabilities of the plastic tank reduce energy consumption.

For safety reasons, most instant hot water dispensers operate at atmospheric pressure and have an air vent passage for the tank which terminates in a protected enclosure such as the dispensing valve to insure that the air vent is not obstructed, which could cause a pressure build-up.

SUMMARY OF THE INVENTION

The invention provides a safety seal and clamping arrangement for an atmospheric pressure hot water dispenser to secure an upper plastic tank top section to a lower brass tank bottom section, which seal permits escape of pressure in the event the tank vent tube becomes clogged and upon severe pressure build-up permits release and separation of the top and bottom tank sections. The upper tank section has a lower edge with a lip which is supported on a shoulder within the upper rim of the lower tank section. An O-ring between the lip and rim provides a liquid seal. Inasmuch as the lip of the upper tank is plastic and has a greater coefficient of expansion than the brass tank section, the seal is enhanced when the water is heated to operating temperature as the expanding plastic tank wall presses the O-ring radially outwardly against the brass rim.

The clamping arrangement to secure the upper and lower tank sections together includes a plurality of spaced radially outwardly extending tabs adjacent the bottom of the plastic tank section which fit within notches in the rim of the brass tank section. A metal retaining ring fits between outturned brass flanges and the plastic tabs which are beneath the brass flanges. An increase of pressure in the interior of the tank caused by an obstructed vent passage can cause deformation or compression of the O-ring to release the pressure. In case of a severe or rapid pressure build-up, the brass flanges which anchor the ends of the metal clamping ring will bend or deform to release the retaining ring and hence cause separation of the tank sections.

Other aspects of the invention include an expansion chamber at the top of the upper tank section which employs a common wall as a divider which separates the tank interior from the expansion chamber. This reduces the cost of the unit and minimizes the overall length. The cover for the expansion chamber is molded from plastic and includes an integrally molded inlet stem with an aspirator opening at a venturi section which operates during use to withdraw heated water from the expansion chamber. The cover is also provided with an O-ring and a wire clamping arrangement similar to that holding the tank sections together to provide easy access to the parts. The bottom wall of the expansion chamber and the lower surface of the cap are provided with integrally molded ball valve capture sections which retain a ball float valve member in a position adjacent the aspirator opening to seal the aspirator opening when there is no water in the expansion chamber to prevent air from being drawn into the system.

The use of the integral expansion chamber also enables maintaining the expanded water at tank temperature, which reduces energy consumption and heat losses.

Other advantages, features and objects of the invention will become apparent from the disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
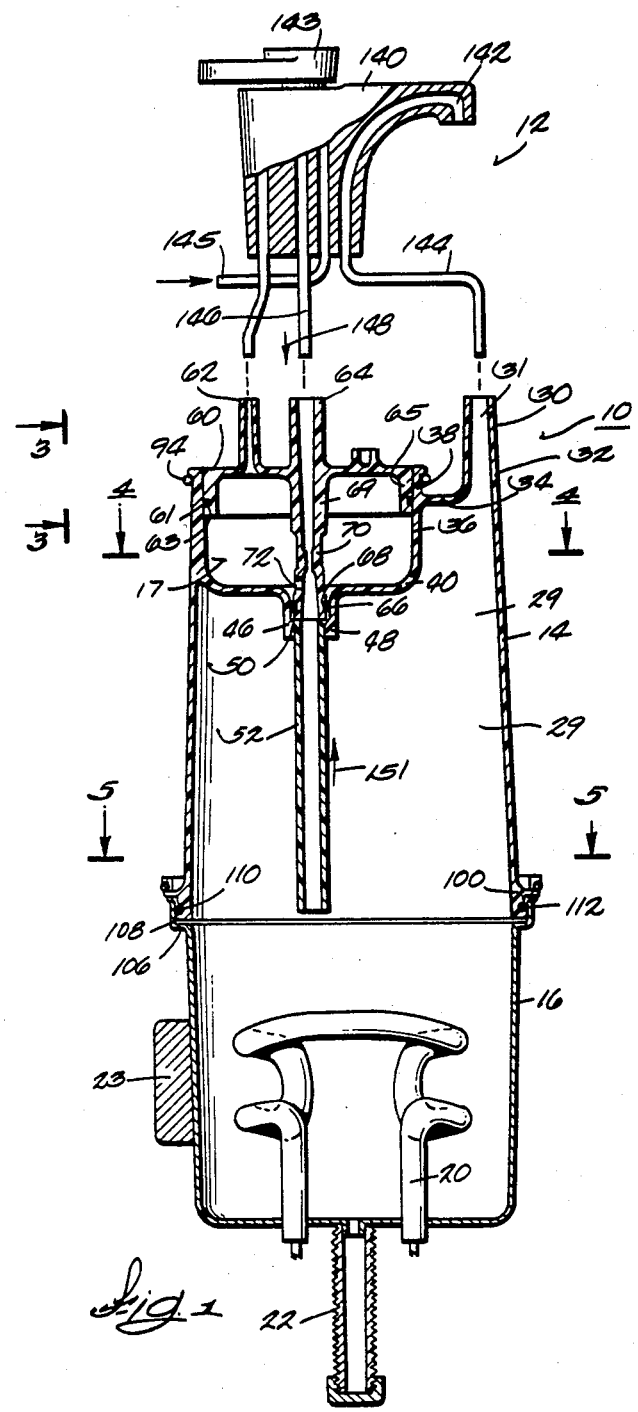
FIG. 1 is a side elevational view in fragmentary section of a hot water dispenser in accordance with the invention.
Figure 3:
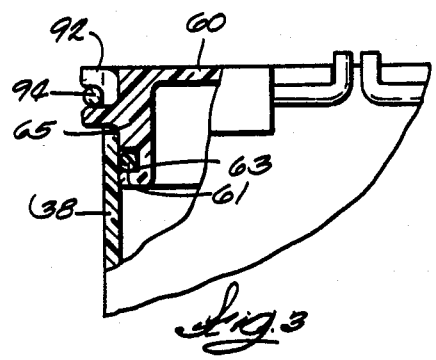
FIG. 3 is an enlarged fragmentary view along line 3—3 of FIG. 1.

In the drawings, FIG. 1 shows a hot water dispenser 10 which includes a dispensing head 12, an upper tank section 14 and a lower tank section 16. An expansion chamber 17 is located adjacent the top of tank section 14. The lower tank section 16 is conventionally provided with a heating element 20 and can be provided with a drain 22. The lower tank section 16 is preferably formed of brass or other metal. The use of a metallic or brass lower tank section facilitates connection of the tank to various components, including an outer jacket or housing (not shown). The brass tank also provides good thermal conductivity to allow fast thermal response time of an externally mounted thermostat 23 and thermal fuse. A fast response time enables good temperature control. As hereinafter described, the incoming cold water is directed toward the metal bottom to provide rapid actuation of the thermostat to energize the heating coil.

The upper tank section 14 is desirably constructed of plastic. With the use of a plastic such as polysulfone, having a thermal conductivity many times less than brass, the plastic provides good insulation to reduce the energy consumed in maintaining the water in the tank at the selected temperature. In addition, the use of the plastic upper tank section enables integral formation of plumbing connections with the tank components to provide better sealing capabilities. The use of transparent plastic permits inspection.

More specifically, the upper tank section 14 includes an integrally molded neck portion 30 which extends upwardly and merges with an outer frusto-conical tank wall portion 32. Neck 30 has a passage 31 which provides the hot water outlet from the tank interior 29 and is easily connected to the dispenser head 12. Adjacent the outlet neck 30 is a top wall portion 34 which joins with a non-concentric cylindrical wall portion 36 which is offset from the longitudinal axis of the wall 32 and defines the cylindrical side wall of the expansion chamber 17. The bottom wall 40 of the expansion chamber 17 is provided with a downwardly extending neck 46 which has an inturned lip 48 to loosely support the outwardly flared end 50 of an inlet tube 52 which is desirably made of copper and dropped in place in the neck 46 during assembly.

Figure 2:
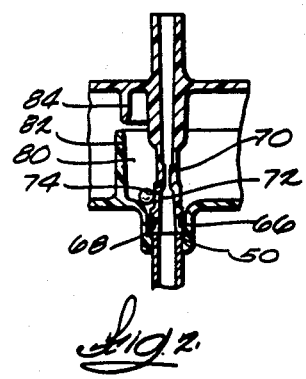
FIG. 2 is an enlarged sectional view of the aspirator ball valve assembly along line 2—2 of FIG. 4.
Figure 5:
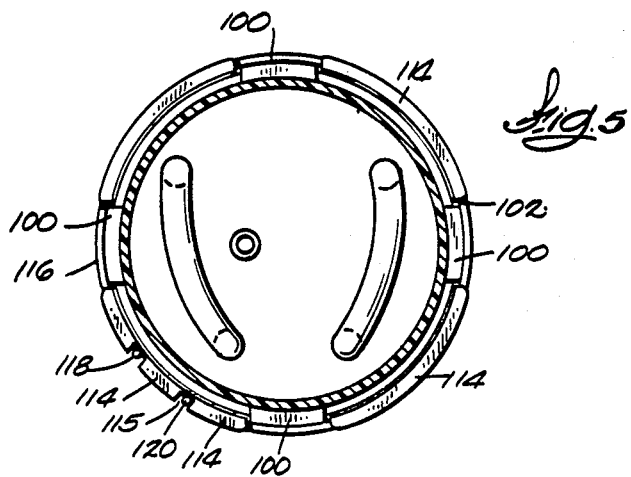
FIG. 5 is a sectional view along lines 5—5 of FIG. 1.
Figure 6:
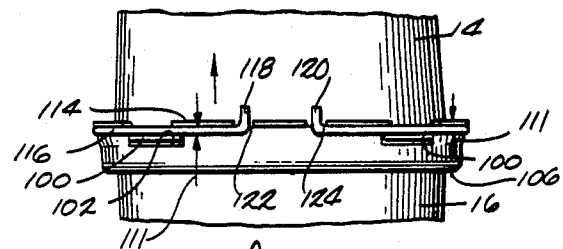
FIG. 6 is a view taken along line 6—6 of FIG. 4.
Figure 4:
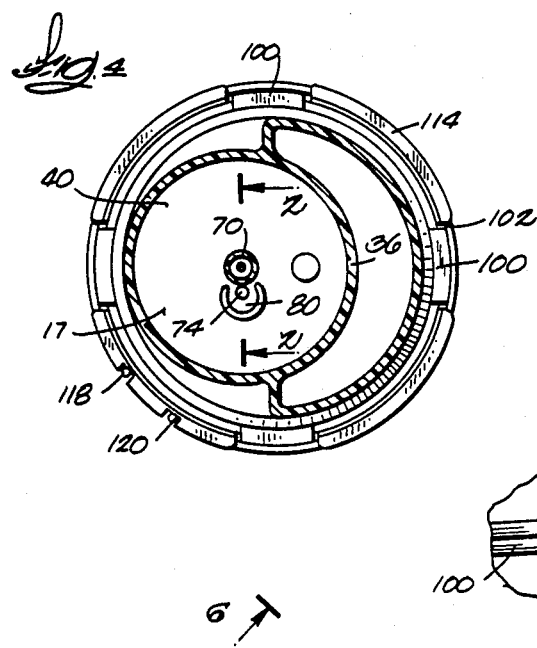
FIG. 4 is a sectional view along line 4—4 of FIG. 1.

The expansion chamber 17 is enclosed by a cover or top 60 which also is preferably formed from plastic and has an integrally molded vent neck 62 and an inlet neck 64. The top 60 has a stem 69 that extends downwardly from the neck 64 to interfit in the neck 46. An O-ring 66 is carried in a groove 68 in the stem and provides a fluid seal between the expansion chamber 17 and the interior of the tank. The stem 69 is provided with a venturi passage 70 (FIG. 2) which is upstream from an aspirator opening 72 to increase water velocity to assist in aspirating heated water from the expansion chamber as subsequently described.

A ball valve member 74 floats in a chamber 80 formed by upper and lower arcuate wall sections 82 and 84 which confine the ball member in a zone adjacent the aspirator opening 72. The ball float member seals the aspirator opening 72 when there is no water present in the expansion chamber and prevents air from being injected into the cold water intake, which can cause spitting at the faucet or dispenser spout.

The cover 60 is provided with an O-ring seal 61 carried in a groove 63 in the depending wall 65 of the cover. The cover 60 is secured to the upstanding wall 38 by a series of laterally projecting tabs which interfit in gaps or notches 92 in wall 38. Outturned flanges on the wall 38 hold a retaining ring 94 which locks the cover in place.

Similarly, the upper tank section 14 is secured to the lower tank section 16 by an arrangement which includes spaced laterally outwardly projecting plastic flanges or tabs 100 on the upper tank section. The tabs 100 extend into notches 102 in the lower housing section. The brass tank has an outturned wall portion which provides a shoulder 106 which is located beneath the lower lip 108 of the plastic upper tank 14. The lip 108 is beneath a groove 110 which carries an O-ring seal 112. The upper periphery of the lower tank includes outturned flanges 114 separated by the gaps or notches 102. When the upper tank tabs 100 are assembled in the notches 102, the tabs 100 are below the level of the flanges 114 so that there is a space 111 to receive a wire retaining ring 116 which is pressed between the two sets of flanges. Upturned ends 118 and 120 secure the retainer ring in place in small notches 122 and 124 in the metal flanges 114.

Figure 7:
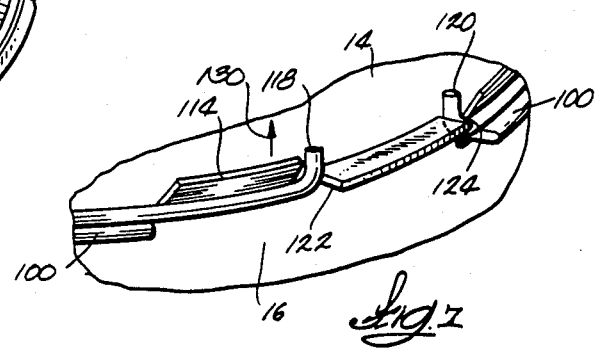
FIG. 7 is a fragmentary perspective view showing release of the retainer ring under pressure.

Because the plastic upper tank section has a higher coefficient of expansion than the brass bottom, increasing the temperature of the tank to a typical operating temperature of approximately 190° will cause the plastic to expand and press the O-ring seal against the metal lower tank wall adjacent thereto. This enhances the sealing capability of the O-ring. In the event the vent 62 and outlet 31 become clogged and there is a pressure build-up in the tank, the O-ring seal will deform and release the pressure. If a rapid severe pressure build-up occurs, the plastic tabs 100 will press upwardly on the retainer ring and deform the small flanges 114 in the direction of arrow 130 (FIG. 7) to release the retainer ring which will disengage and enable separation of the tank sections and release of pressure.

The dispenser head 140 includes a water discharge passage 142 which is connected by a conduit 144 to the outlet neck 30. The inlet passage 145 is connected to a valve (not shown) in the head 140 which is controlled by handle 143. The vent neck 62 is connected to a passage which terminates in the body of the dispenser and is always open to the atmosphere.

Operation of the dispenser handle will cause water flow through the building plumbing system passage 145 into the passage 146 in the direction of arrow 148 and into the inlet neck 64. Cold water coming through the inlet stem will aspirate hot water from the expansion tank 17 if water is contained therein and the float valve 74 is open. Heated water expands and rises through the inlet pipe 52 in the direction of arrow 151 into the expansion chamber through the aspirator hole 72 when the dispenser is not in use. The expansion chamber prevents the expanded water from dripping out the faucet spout during the heating cycle. The incoming cold water forces heated water out of the discharge passage 142 in the dispenser which is connected by a conduit 144 to the passage 31. Any water discharged is replaced by incoming cold water and, accordingly, the tank is maintained in a full condition at all times. Inasmuch as the fill tube directs water into the lower tank section adjacent the thermostat, rapid sensing of a temperature drop caused by incoming cold water causes actuation of the thermostat and heater.

What is claimed is:
1. An instant hot water heater dispenser comprising:
 a. tank means for storing and heating water prior to dispensing thereof, the tank means having an upper tank wall portion;
 b. wall means formed integrally with the upper tank wall portion for defining an open top water expansion chamber;
 c. a valve chamber wall formed integrally with the wall means;
 d. a cover for sealingly closing the expansion chamber, the cover including:
  i. a vent and a cold water inlet stem formed integrally with the cover, the inlet stem extending downwardly from the cover and having an aspi- rator opening to provide communication between the inlet water and the expansion chamber; and ii. a valve chamber wall formed integrally with the cover for cooperating with the wall means valve chamber wall to define a valve chamber for confining an aspirating valve member therein; and e. retainer means for locking the cover in place to the expansion chamber wall means.

* * * * *